United States Patent [19]

Lev

[11] Patent Number: 5,197,512
[45] Date of Patent: Mar. 30, 1993

[54] HIGH PRESSURE SLUICE KNIFE GATE VALVE

[76] Inventor: Yury Lev, 830 Holmes Ave., Deerfield, Ill. 60015

[21] Appl. No.: 557,690

[22] Filed: Jul. 25, 1990

[51] Int. Cl.⁵ .......................... F16K 3/02; F16K 3/316
[52] U.S. Cl. .................................. 137/375; 251/327; 251/329
[58] Field of Search ................. 251/327, 328; 137/375; 138/94.3

[56] References Cited

U.S. PATENT DOCUMENTS

| | | | |
|---|---|---|---|
| 2,883,148 | 4/1959 | Williams | 251/328 X |
| 3,844,531 | 10/1974 | Grengs | 251/327 |
| 4,257,447 | 3/1981 | Clarkson | 251/327 X |
| 4,377,274 | 3/1983 | Mayhew, Jr. | 251/327 |
| 4,688,597 | 8/1989 | Clarkson et al. | 137/375 |
| 4,765,361 | 8/1989 | Clifford | 251/328 X |
| 4,881,719 | 11/1989 | Bowman | 251/328 |

*Primary Examiner*—Arnold Rosenthal

[57] ABSTRACT

A high pressure sluice knife gate valve, comprised of two identical body halves, which does not require a bonnet, but carries the features of a bonnet. This type of construction provides a number of advantages not found on prior art gate valves:

(1) Because a bonnet is not needed, the use of a seal around the blade is eliminated, since the body itself contains the pressure.
(2) The design minimizes the axial dimension of the chest cavity, thereby reducing stresses in the body. The body is, therefore, light weight and compact.
(3) Depending on its size, this type of valve construction can be used for applications where fluid pressure is 300 PSIG and higher.
(4) The liner in the valve is comprised of two identical halves. In addition to guiding, seating and wiping the blade, the liner also performs two other important functions:
 (a) Seals the components attached to the valve, including pipe flanges and valve actuating devices.
 (b) Guarantees separation of the fluid from the valve body in both the open and closed positions.

6 Claims, 4 Drawing Sheets

HIGH PRESSURE SLUICE KNIFE GATE VALVE

FIELD OF THE INVENTION

This invention relates to a high pressure sluice knife gate valve and, more particularly, to a valve comprised of two indentical body halves and a replaceable molded liner which is comprised of two identical halves. Unlike the most commonly used design approach for high pressure sluice knife gate valves, the principle design of this invention eliminates the need for a bonnet as a separate part of valve.

BACKGROUND OF THE INVENTION

Various types of high pressure sluice knife gate valves are known in the art. These types of knife gates can be divided into two different designs, including an open blade type knife gate and a bonneted structure type gate.

An open blade type knife gate necessitates the use of a seal around the blade. Because a packing type seal is normally used in this gate, the resultant design is limited to applications where fluid pressure is less than 150 PSIG.

Bonnet structures are attached to the knife gate as a separate element. The use of a bonnet eliminates the need for a seal around the blade and relies instead on a seal around the cylindrical actuator rod. This type of seal arrangement is suitable for applications where fluid pressure is 300 PSIG and higher.

This invention relates to an improvement over all the known prior art knife gate valves. It is a primary object of this invention to provide a gate valve wherein the principle design has the body itself carrying the features of the bonnet. This allows the valve to:

(1) Contain the fluid pressure without the use of a special seal around the blade;
(2) Minimize the axial dimension of the valve body;
(3) Minimize stresses in the valve body;
(4) Operate in applications where fluid pressure is 300 PSIG and higher;
(5) Operate with a replaceable liner comprised of two indentical halves.

The liner as shown in FIG. 1 provides two new features:

(1) Seals the components attached to the valve, including pipe flanges and valve actuating devices.
(2) Guarantees separation of the fluid from the valve body in both the open and closed positions.

The latter feature is important in applications wherein the chemistry of the fluid is damaging to the valve body material and also wherein environmental protection is a concern.

DESCRIPTION OF DRAWINGS

Figure 1:
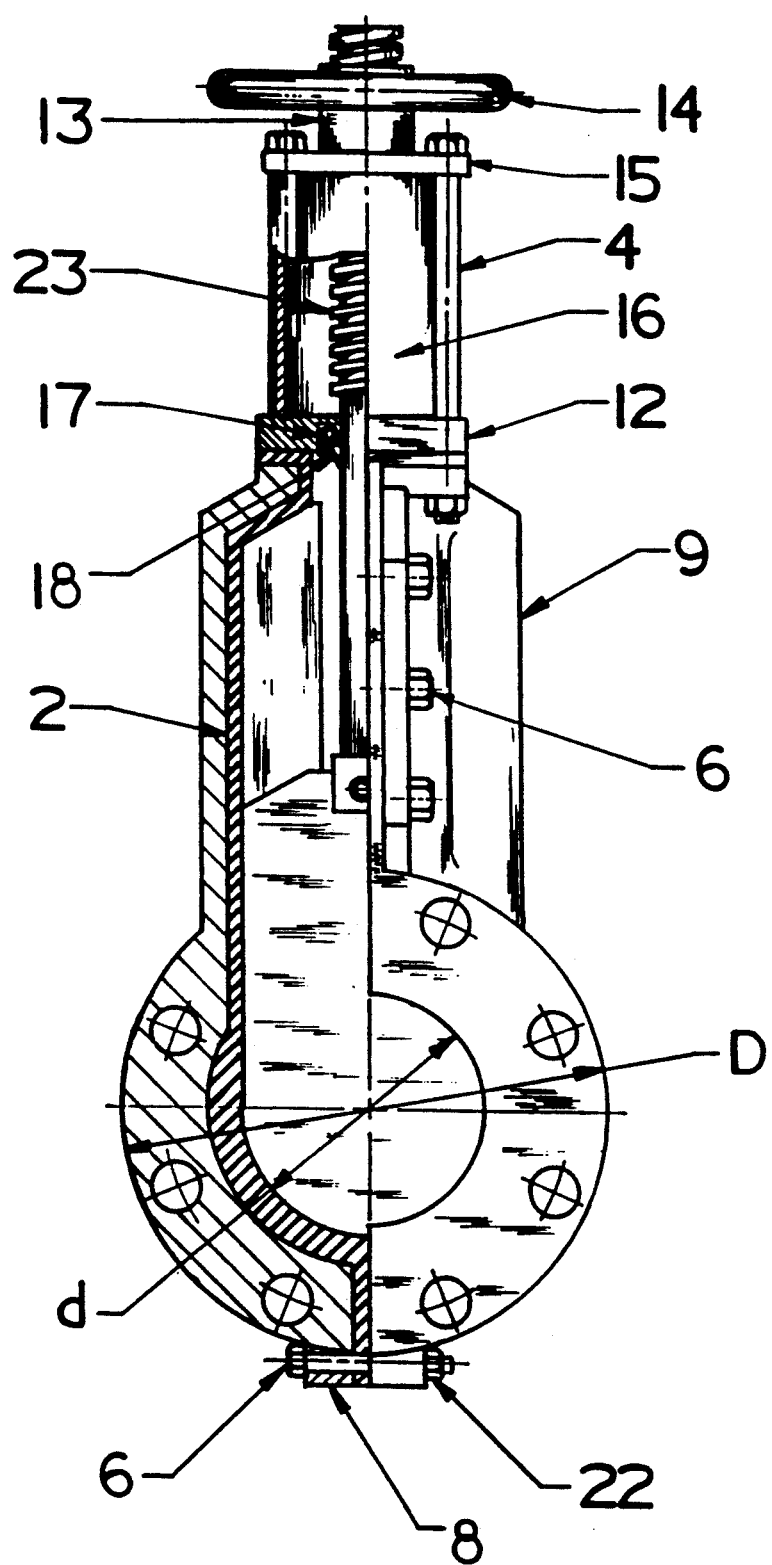
FIG. 1 is a front partially cut-away view of this invention.
Figure 2:
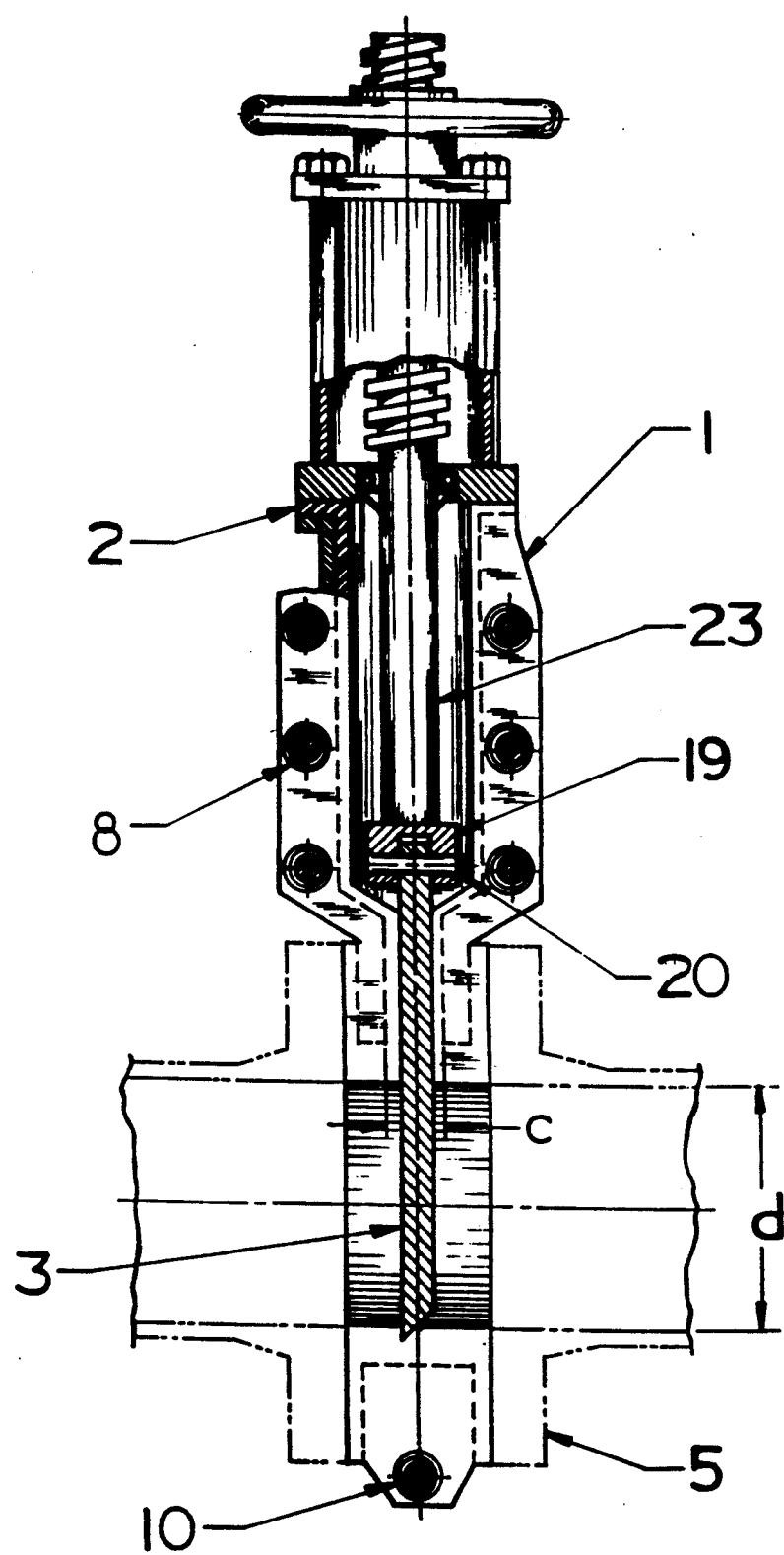
FIG. 2 is a side-sectional view of this invention.
Figure 3:
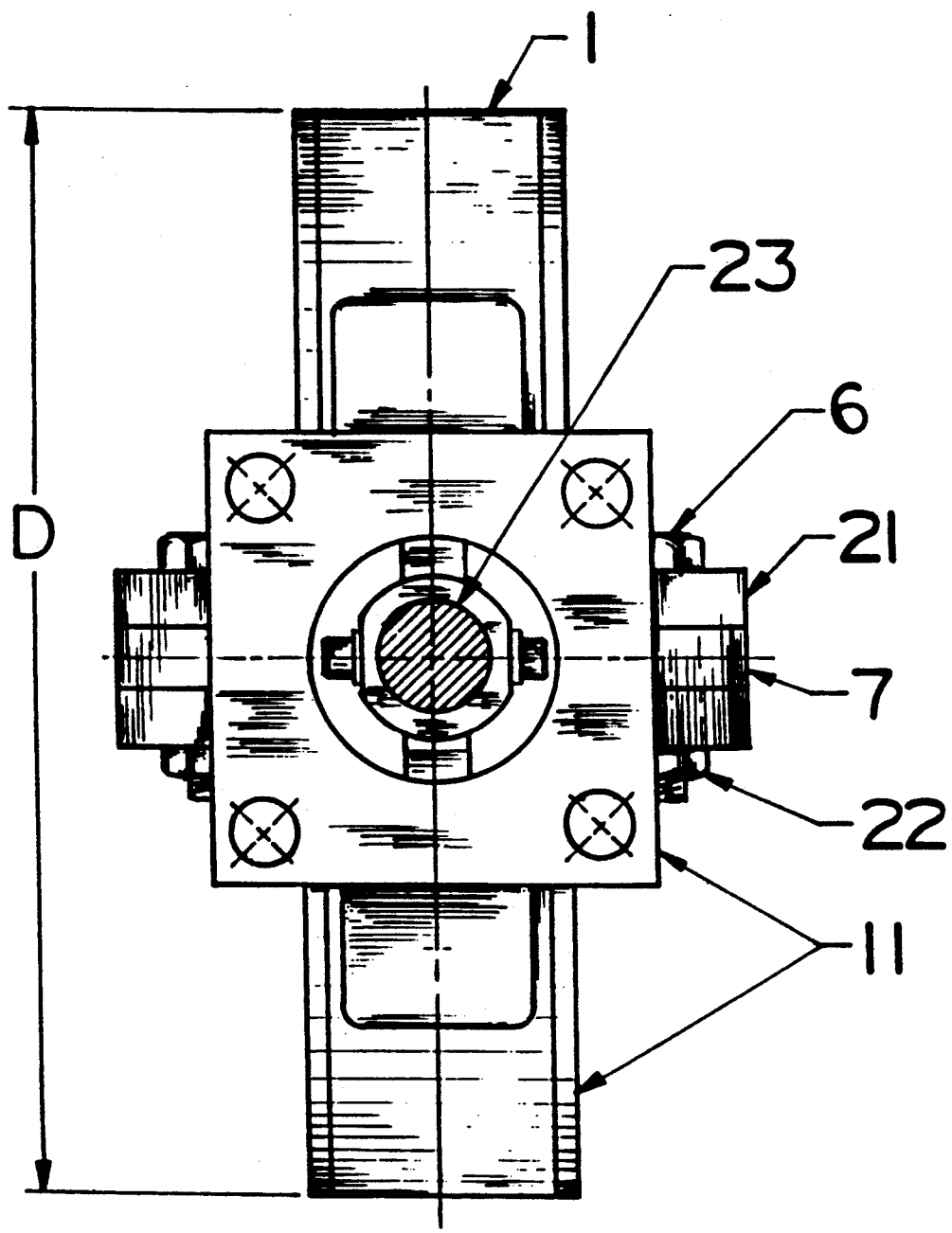
FIG. 3 is a top, partially cut-way, view of this invention with the operator removed.
Figure 4:
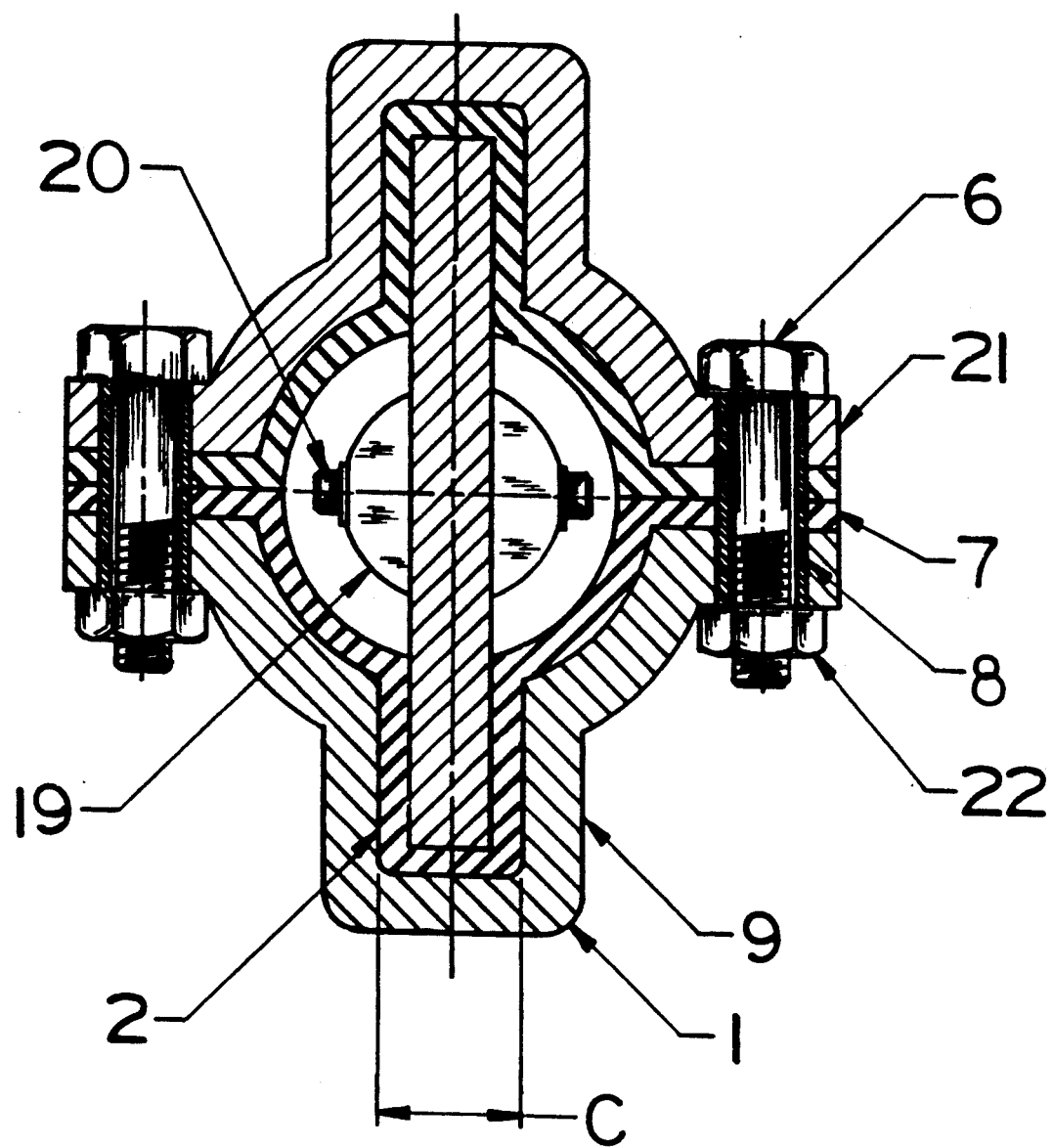
FIG. 4 is a top cross-sectional view of this invention which is perpendicular to the rod.

The major components of the present invention may be described with greater detail with reference to FIG. 1. This illustration depicts a partial, cross-sectional view of the gate valve.

DESCRIPTION OF SPECIFIC EMBODIMENTS

The valve body is formed of a pair of identical forgings or castings 1. Each half of the body has a semicircular lower end of diameter D and upper portion of the body 9.

A replaceable polymer liner 2 is also formed of a pair of identical halves. The outer form of the liner half fits exactly in the cavity of the body half. The body has wings 21 and the liner halves have wings 7. The wings in both the body and the liner have holes 10. Bolts 6 and nuts 22 hold the two halves of the body together. The wings of the liner 7 provide sealing action which is controlled by the inserts 8.

When the two halves are assembled together, the liner 2 forms a circular passage of diameter d through which fluid flows when the valve is open.

A blade 3 can slide up and down in the slot formed by the liner havles 2. The blade is comprised of a flat piece of steel. The edge at the semicircular, lower end of the blade is knife shaped, while the upper end of the blades uses a rectangular cross section. When the valve is closed, the lower semicircular end seats within a similarly conforming recess of the liner 2, providing the blade seal.

The upper end of the blade extends from the semicircular part into the chest of the liner. This chest also has a rectangular cross section, which facilitates guiding the blade and sealing at the upper section of the valve.

A threaded rod 23 is attached to the blade 3 by means of a yoke 19 and a pin 20. The unthreaded portion of the rod 23 extends through plate 12 and plate 15 into a hand wheel 14. The hand wheel 14 is supported by a plate 15 for engaging the threaded rod 23. As is well known in the art, rotation of the hand wheel 14 produces vertical movement of the threaded rod 23 to raise and lower the blade 3. It is to be understood that the illustrated yoke, threaded rod and hand wheel are merely representative of a type of apparatus for selectively raising and lowering the blade. An air cylinder or bevel gear are also suitable for actuating the blade.

The plate 12 accommodates the seal 17 and metallic scraper 18. The scraper 18 removes any particles that may penetrate between the blade 3 and the liner 2 and stick to the unthreaded portion of the rod 23. The seal 17 retains the pressure within the valve body and inhibits the flow of fluid through the passageway adjacent to the rod 23.

To provide free movement of the rod 23 and yoke 19, the body and the liner have a cylindrical channel that starts in the vicinity of the yoke 19 when the valve is closed. The hand wheel 14 is supported by a plate 15 which is held attached to the body 1 by bolts 4 together with plate 12 and tubing 16.

An object of the present invention is to eliminate the need for any special gaskets. The liner construction eliminates the need for a packing or any other types of seal around the blade 3. This minimizes the chest cavity axial dimension C and, respectively, reduces stresses in the body from fluid pressure. Effectively, this allows the valve to be used in applications where fluid pressure is 300 PSIG and higher.

The principle design of the high pressure sluice knife gate valve described herein provides these advantages:

(1) The upper area 9 of the body 1 provides the benefits of a bonnet without the disadvantages of a valve which employs the bonnet as a separate component.

(2) The liner 2 excludes the need for gaskets to seal the pipe flange and actuating device.

(3) The overall valve design facilitates service and reduces service-related expenses.

(4) Low level maintenance personnel can be used to perform service or repair procedures.

(5) Because the body 1 and liner 2 are each comprised of identical halves, only one pattern is required for the body and only one mold is required for the liner. Valve parts can, therefore, be manufactured inexpensively and without a high level of precision without sacrificing functional features.

(6) As a result of the principle design, the body 1 can be constructed of light weight material, such as aluminum alloys, without compromising its structural integrity under high pressure.

SUMMARY OF THE INVENTION

A primary object of the present invention is to incorporate a bonnet and valve body in one structure. This feature allows the knife gate valve to be used in applications where fluid pressure is 300 PSIG and higher.

Still another object of the invention is to provide a replaceable liner, which in addition to its known use of guiding, seating and wiping the blade, also provides guaranteed separation of the fluid from the actuator components. Because these components are effectively isolated from fluid, the valve can be used in many applications, and the valve body can be constructed of inexpensive materials, such as gray iron, ductile iron, etc.

I claim:

1. A high pressure sluice knife gate valve assembly comprising:

two identical body housing members each having a semicircular end and a bonnet-like portion extending upwardly from the said semicircular end;

means securing said housing members together in a side-to-side ralation with means therebetween to define a lined chest cavity through which a blade is dropped in a blade passageway with opposing sidewalls spaced from the opposing surfaces of the blade itself, having a knife-shaped semicircular lower end, and an upper rectangular cross section extending upwardly into the said chest cavity, where a threaded rod is attached to the said blade, with an annular lined through passage extending downwardly from the said chest cavity, eliminating the traditional bonnet structure.

2. A high pressure sluice knife gate valve assembly as defined in claim 1, having an axial splice means securing said two body housing members together and employing rectangular ribbed outboard wings along the said splice for reinforcing the said valve assembly.

3. A high pressure sluice knife gate valve assembly as defined, wherein said body housing is cast and machined in one piece, thereafter axially spliced thereby producing two perfectly matched body housing members ready to be joined at the said splice in a side-to-side fashion.

4. A high pressure sluice knife gate valve assembly as defined in claim 3, wherein the said valve body further comprises a replaceable molded pliant liner of two identical halves for guiding, seating, wiping, and sealing the blade, pipe flanges and valve actuating devices, thereby guaranteeing separation of fluid from the said valve assembly in both open and closed positions, both liner halves joined together in a side-to-side fashion and sandwiched between the spliced, machined members of the said valve assembly.

5. A high pressure sluice knife gate valve assembly as defined in claim 4, comprising a liner chest cavity having a blade passage with opposing surfaces of the gate, a ring defining a bore and extending downwardly from said chest cavity in general planar alignment therewtih, a depression disposed within said bore for defining a seat for the gate, and a rectangular cross section for guiding the said blade and sealing the upper bonnet-like section of the said chest cavity.

6. A high pressure sluice knife gate valve assembly as defined in claim 5, comprising a liner having annular flanges around the said bore, which function as a gasket to seal the said valve assembly from pipe flanges, rectangular outboard wings which function as a gasket to seal between the two said housing members, and a rectangular cross section which functions as a gasket to seal the actuator from the said valve assembly, thereby withstanding high pressure as well as low pressure applications.

* * * * *

UNITED STATES PATENT AND TRADEMARK OFFICE
CERTIFICATE OF CORRECTION

PATENT NO. : 5,197,512
DATED : March 30, 1993
INVENTOR(S) : Yury Lev

It is certified that error appears in the above-indentified patent and that said Letters Patent is hereby corrected as shown below:

Title page, item [54], Title, and col. 1, line 1, should read--"AXIALLY SPLICED HIGH PRESSURE SLUICE KNIFE GATE VALVE"

Signed and Sealed this

Twenty-sixth Day of April, 1994

Attest:

BRUCE LEHMAN

Attesting Officer

Commissioner of Patents and Trademarks